United States Patent [19]

Hunzinger

[11] 4,102,559
[45] Jul. 25, 1978

[54] OPTICAL DEVICE FOR COUPLING OPTICAL FIBERS TO EACH OTHER AND/OR A LIGHT SOURCE

[75] Inventor: Jean-Jacques Hunzinger, Paris, France

[73] Assignee: U.S. Philips Corporation, New York, N.Y.

[21] Appl. No.: 748,559

[22] Filed: Dec. 8, 1976

[30] Foreign Application Priority Data

Dec. 9, 1975 [FR] France .................. 75 37543

[51] Int. Cl.² .................................. G02B 5/14
[52] U.S. Cl. ..................................... 350/96.18
[58] Field of Search .......... 350/96 C, 96 BC, 96 R; 250/555

[56] References Cited

U.S. PATENT DOCUMENTS

| 3,508,807 | 4/1970 | Mayer ................. 350/96 C |
| 3,637,993 | 1/1972 | Christie et al. ........ 250/555 |
| 3,941,121 | 3/1976 | Olinger et al. ....... 350/96 BC X |

FOREIGN PATENT DOCUMENTS 1,429,843   3/1976   United Kingdom ............. 350/96 C

OTHER PUBLICATIONS

R. J. Lynch, "Fiber Optic Connectors", IBM Tech. Journ., vol. 13, No. 2, Jul. 1970, pp. 533-534.

*Primary Examiner*—John K. Corbin
*Assistant Examiner*—Rolf Hille
*Attorney, Agent, or Firm*—Frank R. Trifari; Carl P. Steinhauser

[57] ABSTRACT

Two very thick plano-convex lenses with a common axis are positioned with their convex surfaces facing each other, and a radiation source and the input face of a fiber are each disposed on one of these surfaces in the vicinity of the axis.

The main feature of the device resides in the considerable thickness of the lenses relative to the radii of curvature of the dioptric faces. As a result, aberrations, in particular spherical aberrations, are reduced while the dimensions of the device are such as to enable easy construction and handling.

11 Claims, 7 Drawing Figures

OPTICAL DEVICE FOR COUPLING OPTICAL FIBERS TO EACH OTHER AND/OR A LIGHT SOURCE

The invention relates to an optical device for the injection of radiation energy into single-strand or multi-strand glass fibers, used in optical information transmission systems, or for coupling a plurality of such fibers.

Generally, injection is effected with the aid of a light-emitting diode which faces the fiber end-face. The power consumed by such a diode decreases with its diameter. For this reason the diameter of the diode is often smaller than that of the fiber. The fiber is characterized by its half acceptance angle $\alpha$.

The meridional rays, whose angle with the fiber axis is greater than said angle $\alpha$, traverse the lateral surface of the fiber core instead of being reflected by said surface, so that they do not contribute to the transfer of energy along the fiber.

It follows that the ideal injection system in respect of energy transfer is that system which, using a source which a diameter which is smaller than that of the fiber end-face, enables the through put volume ("etendue") to be saturated, which area volume is defined as the product of the input cross-section of the fiber and a pupil with a solid angle of $2\alpha$ at infinity.

A device which meets this requirement is known. The known device has a simple optical structure, which has been reduced to a single spherical lens, the source being disposed in the object focal point of said lens.

Devices of this type or other devices which also consist of a signal element for which the source is disposed in the object focal point, must necessarily have a small focal distance of the order of a millimeter. Such a focal distance corresponds to small radii of curvature of the dioptric elements, said radii of curvature being as small as a few tenths of a millimeter.

It is evident that such elements exhibit substantial geometric aberrations, but their small dimensions moreover lead to all kinds of practical drawbacks in respect of their use and manufacture, namely problems in handling them, in manufacturing the accessories necessary for mounting and using them and as well as to problems in constructing, machining and reproducing them with high precision.

The invention enables said practical problems to be avoided, while nevertheles the requirement is met that the throughput volume of the fiber is saturated with energy.

It is an object of the invention to achieve this with a device of simple structure, the dimensions of the device being such that the device can be handled conveniently.

Said device is an objective system which instead of projecting the source at infinity projects it onto the fiber end-face at a suitable scale, the dimensions of the image of the source being substantially equal to those of said end-face.

The pupil of the fiber is in fact the aperture of the objective, which is consequently viewed at an angle of $2\alpha$ from any point of the input end-face of the fiber.

It follows that the relative aperture $D/f$ of the objective, where $D$ is the diameter and $f$ the focal distance of said objective, is necessarily related to the angle $\alpha$, as well as to the radii $R$ and $R_S$ of the fiber and of the source and to the distance $p'$ between the fiber and the objective, by the expression $$\frac{D}{f} = 2(\frac{R}{p'} + \alpha)(\frac{R}{R_S} + 1) \quad (1)$$

The optical system in accordance with the invention is furthermore free of any significant aberrations with regard to the fiber cross-section, while the simple design and dimensions which are such that it can be handled conveniently are maintained.

As a result the small values of $p'$ which in accordance with expression (1) correspond to large apertures $D/f$ and to small dimensions, need not be considered.

On the contrary, the invention concerns itself with greater values of $p'$, in order that the field angle $R/p'$ becomes small relative to $\alpha$ and that the relative aperture in accordance with expression (1) tends towards a minimum which equals $$2\alpha(\frac{R}{R_S} + 1).$$

The field aberrations, i.e. coma, astigmatism, curvature of field, and distortion, are then entirely negligible. The only problem left is that of the attenuation and minimization of the spherical aberration.

Solving the last-mentioned problem is difficult because at a constant relative aperture the spherical aberration spot which is proportional to the system scale becomes larger a the dimensions of the optical system increase which is in contradistinction to what is pursued by the invention.

As a result the invention starts from an optical structure for which the aberration spot for a given transport distance is minimal, yielding a method of linearly scaling-up the said structure in a proportion which increases according as the size of the spot decreases. Accordingly, the invention proposes a basic structure which comprises two very thick plano-convex lenses whose convex sides face each other, which structure simple as it is, has a spherical aberration which is substantially smaller than is to be expected for two normal thin lenses.

The special feature of this structure in fact resides in the thicknesses which relative to the radii of curvature used are so great that the space between the object and image is completely filled with glass, for which use is made of the combination of a thin convergent lens with a very thick plano-parallel plate, whose spherical aberrations are of opposite sign and counteract each other, this thick structure of small diameter being perfectly adapted to the small field angles such as occur when radiation energy is injected into a glass fiber or when a plurality of such fibers are coupled in accordance with the present invention, so that the dimensions of the device become such that it can be handled conveniently.

In accordance with the invention an optical device for coupling a source of radiation energy to a single-strand or multi-strand optical fiber it comprises, in the direction of propagation of the light a first plano-convex lens, then a second plane-convex lens, which two lenses are very thick, their axes coinciding with that of the fibre at the fibre input, and their convex sides facing each other. The source of light energy is disposed substantially perpendicularly to the said axis in the immediate vicinity of the center of the plane surface of the first lens and the input end-face of the fiber in the immediate vicinity of the center of the plane surface of said second lens. An immersion liquid which is transparent to the propagated radiation may be introduced between source and lens and between lens and fiber. The radii of curvature of the dioptric faces of the different lenses, their diameters, their thicknesses and the refractive indexes of their constituent materials are such that the system formed by the two lenses optically conjugates the source to the input end-face of the fiber. The diameter of the image of the source is substantially equal to the diameter of the fiber, the image aperture angle being at least equal to half the acceptance angle of the fiber. The ratio of the radii of the convex dioptric surface is such that the spherical aberration is minimal for the selected magnification and the refractive indexes of the materials of the lenses.

The invention furthermore relates to a device for coupling a plurality of optical paths to each other, thus enabling different sets of information to be mixed, information which is conveyed by means of light of different wavelength to be selected or the injection or extraction of energy and information to be injected into or extracted from one or a plurality of optical paths.

In order that the invention be more fully understood embodiments of it, which are given by way example, will be described in more detail with reference to the drawings, in which:

FIG. 1 shows a typical embodiment of the device used for injecting light energy into a fiber.

Figure 1:
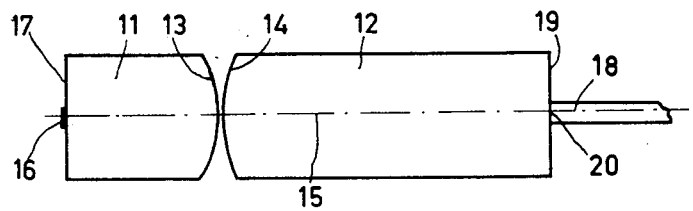
FIG. 1 is a sectional view of a single-channel coupling device according to the invention in accordance with a plane which passes through its axis of symmetry.

The device comprises two thick lenses 11 and 12. These lenses are plano-convex and very thick. Their spherical dioptric surfaces 13 and 14 substantially contact each other, the lense axes coinciding. The common axis bears the reference numeral 15.

The light source is designated 16. Said source is disposed in the plane surface 17 of the lens 11 in the center of said surface or in its immediate vicinity. A glass fiber of small diameter bears the reference numeral 18. Its input end-face 20 is disposed in the immediate vicinity of the surface 19 of the lens 12 in the center of said surface, the axis of the fibre being in line with the axis 15 at the location of said input.

The optical combination consisting of the two lenses 11 and 12 forms an image of the source 16 on the input face 20 of the fiber.

This structure should meet the requirement that the only aberration which is present, the spherical aberration, is small, taking into account the radius of the source and of the fiber respectively, for example 100 $\mu$ for the radius of the source and 300 $\mu$ for the radius of the fiber.

The invention is based on the discovery that for an optical combination comprising the elements of FIG. 1 and whose magnification, thicknesses and refractive index are given, the diameter of the spherical aberration spot passes through a minimum when the power of the combination is suitably distributed over the two convex dioptric surfaces. This situation, which corresponds to an optimized system, is utilized by the invention to determine the radii of curvature of the dioptric surfaces. When:

$N$ : is the common refractive index of the two lenses,
$e_1$: the thickness of the lens at the source side (positive value)
$e_2$: the thickness of the lens at the fiber side (positive value),
$g$: the magnification, which is assumed to be negative,
$\alpha$: half the acceptance angle of the fiber in radians,
$r_1$: the radius of curvature of the lens with a thickness $e_1$,
$r_2$: the radius of curvature of the lens with a thickness $e_2$;

The diameter $t$ of the spherical aberration spot in the object space is given by:

$$t = K(N, g)\alpha^3 e_1 \qquad (2)$$

where $K(N, g)$ is a function of refractive index and the magnification, which function is expressed by:

$$K(N, g) = \frac{1}{4N^2}\left[\frac{q^2}{4p} - S\right]$$

with $$P = (2 + \frac{1}{N})(g - 1)$$

$$Q = \frac{4N^2 + N - 2}{N(N - 1)} - \frac{4N + 2}{N - 1}g + \frac{N + 2}{N(N - 1)}g^2$$

$$S = N - \frac{1}{N} + \frac{1}{N(N - 1)^2}(g - N)^2(g - N^2)$$

$$r_2 = \frac{2P}{Q} \cdot ge_1$$

$$\frac{1}{r_1} = \frac{1}{r_2} - \frac{N}{N - 1} \cdot (1 - \frac{1}{g}) \cdot \frac{1}{e_1}$$

$$e_2 = -g\, e_1$$

Thus, the size of the spot in accordance with expression (2) depends on the thickness of the lens 11 at the source side, on the acceptance angle $\alpha$ of the fiber, and on a factor which is a function of the refractive index and the magnification only.

If the fiber acceptance angle and the thickness of the thinner of the two lenses are given, i.e. $\alpha$ and $e_1$, the size of the spot is directly proportional to the value of K.

The calculations reveal that high values of the refractive index have a substantial influence on the reduction of the spot size.

In particular, it is an object of the invention to propose refractive index values, which, though high, correspond to commercially available materials.

Saturation of the throughput volume of the fiber, which is a further object of the invention, is achieved when in the object space of the optical coupling system, each ray belonging to said volume corresponds to an object ray, which effectively passes through the source.

In other words (and assuming that the direction of the light is reversed) the aberration image of the input face on the fiber should be contained entirely within the effective area of the source. This aberration image has a diameter which equals the sum of the fiber diameter divided by the absolute value of the magnification plus the diameter of the spot given by expression (2). Thus, the requirement for saturation is given by the expression:

$$\frac{2R}{-g} + t = 2R_S \qquad (3)$$

where R and $R_S$ are the fiber and source radius respectively or ultimately by the following expression (4), which is obtained by combining the expressions (2) and (3):

$$\frac{1}{\alpha^3 e_i} (2R_S \cdot g + 2R) = g K (N, g) \qquad (4)$$

Of the 6 parameters which are related to each other by this expression, 3 parameters are generally known in practice: $2R_S$ is the source diameter, 2R the diameter of the fiber of bundle of fibers, and $2\alpha$ the acceptance angle.

In accordance with the invention the lens 11 should be a priori have a thickness of $e_1$ of a few millimeters so as to make it large enough to be handled. Expression (4) then becomes an implicit relation between the refractive index N and the magnification g.

This relation has been drawn up graphically by attributing comparatively high values to the refractive indexes, but which should yet enable the spherical aberration to be minimized.

The real solutions are given by the points of intersection of a curve which represents the product $g \cdot K(N,g)$ as a function of g, and the straight line which is determined by the left-hand member of equation (4) in a rectangular co-ordinate system (g, −gK).

Figure 2:
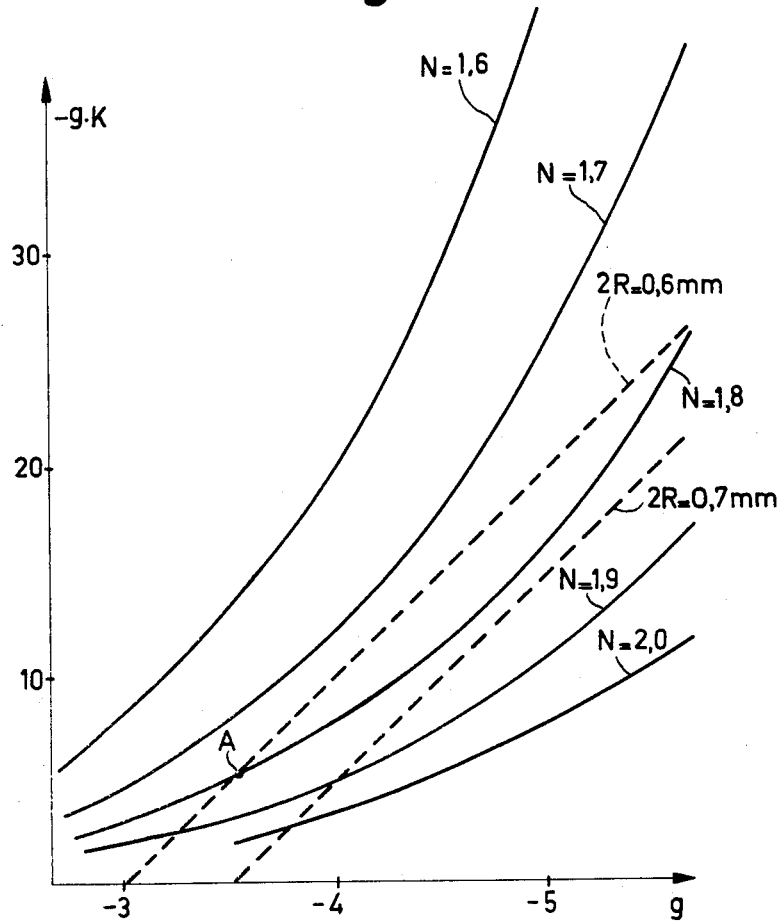
FIG. 2 are graphs which facilitate the construction of said device.

FIG. 2 represents the product $gK(N, g)$ for different values of N between 1.6 and 2.0 and two straight dotted lines which correspond to fiber diameters 2R = 0.6 mm and 2R = 0.7 mm respectively for the following values of $\alpha$, $e_1$ and $R_S$:

$$\alpha^3 = \frac{1}{200} (\alpha \simeq 10°)$$

$$e_1 = 4 \text{ mm}$$

$$2R_S = 0.2 \text{ mm}$$

In one case there is only one solution in accordance with the invention for values of the refractive index greater than 1.7. In the other case N should be greater than 1.8. These values of the refractive index do not correspond to those of the most common types of commercially available glass. Yet, they correspond to existing types of glass.

These values relate to values of the angle $\alpha$ of the order of 10°. For certain fibers for which the difference in refractive index between the core and the cladding is only 0.006, the angle $\alpha$ is smaller than 10°; the slope of the straight lines in FIG. 2, which is proportional to $1/\alpha 3$, then appears to be doubled. As a result, it becomes possible to use types of glass with a smaller refractive index.

Conversely, the use of a very small source with a bundle of fibers (multi-strand fiber) instead of a single fiber (single-strand fiber) demands a refractive index which is higher than 2.0, because the magnification to be obtained is considerable, the use of special materials such as semiconductor glass types is then necessary.

Figure 3:
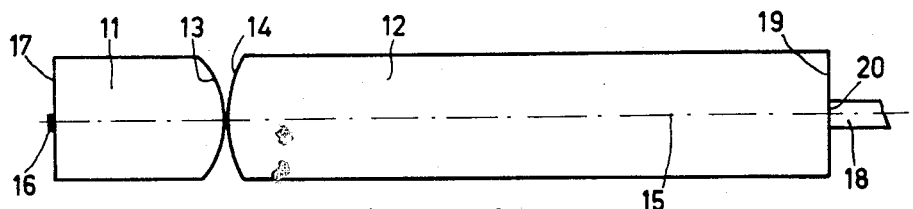
FIG. 3 is a sectional view at a scale of 1:10 in accordance with a plane of symmetry of and embodiment of said device.

FIG. 3 by way of example shows an embodiment of the invention at a scale of 1:10. It corresponds to the values:

$$2R_S = 0.2 \text{ mm}$$

$$2R = 0.6 \text{ mm} \pm 0.01$$

$$\alpha^3 = \frac{1}{200} (\alpha \sim 10°)$$

$$N = 1.8$$

For the magnification a value has been chosen corresponding to point A in FIG. 2 for which g is nearest to $2R/2R_S$ and which corresponds to minimal spherical aberration.

The values of the other lens parameters are:

$$r_1 = -2.13 \text{ mm}$$

$$r_2 = 3.95 \text{ mm}$$

$$e_1 = 3.87 \text{ mm}$$

$$e_2 = 14 \text{ mm}$$

The advantage of this device in accordance with the invention is that the accuracy of the radii of curvature need not be very high. This is because in this device the distribution of the optical power has been optimized so that the spherical aberration spot passes through a minimum. As the diameter of the spot is constant transferring a small fraction of the power from one dioptric surface to the other has hardly any effect.

It is a further object of the invention to minimize the chromatic aberration. Even in the case of electroluminescent sources, which emit radiation in a narrow wavelength band $\Delta\lambda$ of the order of 250 Å, the chromatic aberration spot is in fact not negligible. In the embodiment described hereinbefore the spot diameter is of the order of 3 $\mu$. However, the problem it presents is not as serious as that of the spherical aberration. In order to eliminate this problem it suffices to assume that the source has a diameter $2R_S$ which is a few microns smaller than the actual source diameter.

Figure 4:
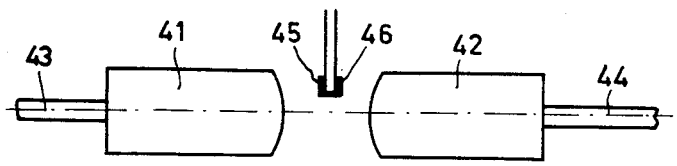
FIG. 4 is a sectional view in accordance with a plane of symmetry of a different embodiment of said device.

Another embodiment of the invention concerns the use of the combination of two plane-convex lenses for optically coupling two optical fibers. The device is shown in FIG. 4.

The lenses 41 and 42 couple the fiber 43 to the fiber 44. The output of the fiber 43 is disposed at the location of the source. In this case $2R_S = 2R$.

The manification of the combination, as in the previously mentioned case, is slightly greater than $2R/2R_S$, which in the present instance equals 1.

It is found that the image of the fiber 43 is larger than and extends beyond the cross section of the fiber 44. This necessarily results in a certain loss of energy. In this case, it is not an object of the invention to determine a suitable magnification, as previously. The magnification is chosen to be −1 ($g = -1$) and it is accepted that the aberration spot extends beyond the input cross-section of the fiber 44. This magnification corresponds to the same thickness $e_1$ for the two lenses.

The expression (2) for the diameter of the spot is then:

$$t = \frac{\alpha^3 e_1}{2N^3(N-1)^2}$$

The refractive index plays a part at high optical powers which in accordance with the invention enables much commoner types of glass with a smaller refractive index to be used.

The following table gives the aberration spot as well as the radii of curvature of the dioptric surfaces for different values of the refractive index in a practical case in which:

| | $\alpha^3 = \frac{1}{200}$ ($\alpha \sim 10°$) $e_1 = 4$ mm $r = |R_1| = r_2$ | | | |
|---|---|---|---|---|
| N | 1,6 | 1,8 | 2 | 2,4 |
| $t_{mm}$ | 0,0113 | 0,0027 | 0,0012 | 0,00037 |
| $r_{mm}$ | 1,5 | 1,78 | 2 | 2,33 |

The spots are at the most 10 $\mu$, which corresponds to perfectly acceptable flux losses of a few percent.

The radii of curvature area 1.5 to 2 mm depending on the type of glass used. Thus, such lenses are technologically feasible.

In order to avoid parasitic reflections at the plane faces of the two lenses and at the input and output faces of the fibers the invention proposes the use of an immersion liquid between fiber and lens.

In the above only the use of lenses of materials with the same refractive index has been considered. It is obvious that with some modifications, which on the basis of what has been described hereinbefore will be evident to those skilled in the art, other embodiments are conceivable using lenses of materials with different refractive indexes, which other embodiments consequently also fall within the scope of the invention.

Similarly, the curves of FIG. 2, which are limited to the values of the parameter N between 1.6 and 2.0, do not imply that the invention is limited to this range of refractive indexes.

The curves have been given by way of example only. Further embodiments utilise materials with higher refractive indexes ranging between 2.4 and 2.6, which materials are processed in accordance with the invention, which yields devices in which the fiber diameter is 3 to 6 times that of the source, the thicknesses and radii of curvature of the lenses being in accordance with the following relations:

$2.5 \leq e_1 \leq 4$ mm $2.5 \leq r_1 \leq 3$ mm $1.5 \leq e_2 \leq 24$ mm $4 \leq r_2 \leq 9$ mm A variant of the preceding device constitutes an extension of the invention and a general application is the coupling of a plurality of fibers to each other and to other elements such as a light-energy receiver or transmitter.

In the preceding device, which has a magnification of $-1$ and in which the two lenses are identical, the image of the fiber end-face formed by each lens is located at infinity in the optical space between the two lenses. Furthermore, the coma is equally zero. Thus, the two lenses may be moved apart without changing the size of the aberration spot. Further, in the absence of coma, the field may become considerable, for example several degrees, so that this device also enables the coupling of bundles of fibers of large diameter.

The space which is formed by moving apart the deoptric elements, as is shown in FIG. 4, may accommodate a small detector 45 for extracting a part of the luminous flux, or an energy injector 46 which is for example disposed behind the detector and which compensates for the flux extracted by the detector. As in this optical space the fiber 44 is viewed under a small solid angle, this injector may be a laser.

Figure 5:
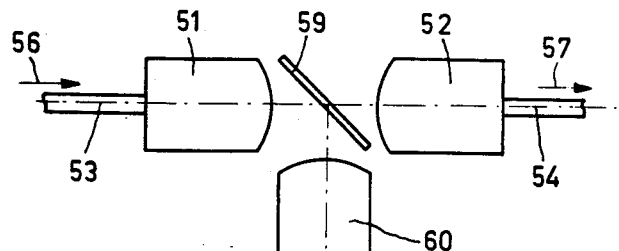
FIG. 5 is a sectional view in accordance with a plane of symmetry of a first embodiment of a device for coupling a plurality of optical paths.

FIG. 5 shows a further application of a pair of lenses as shown in FIG. 4, said lenses being spaced from each other. A separator plate 59 is inserted between the lenses 51 and 52 which are coupled to the fibers 53 and 54 respectively, said plate being inclined relative to their common axis.

The plate 59 reflects a part of the light in the direction of a lens 60 which is similar to 51 or 52 and which is coupled to fiber 55. This lens 60 is disposed at a substantially equal distance from the lenses 51 and 52 and its axis is perpendicular to the axis of the lenses 51 and 52.

The direction of propagation of the light is indicated by the arrows 56, 57 and 58. Thus, a coupling is realized between two optical paths.

Figure 6:
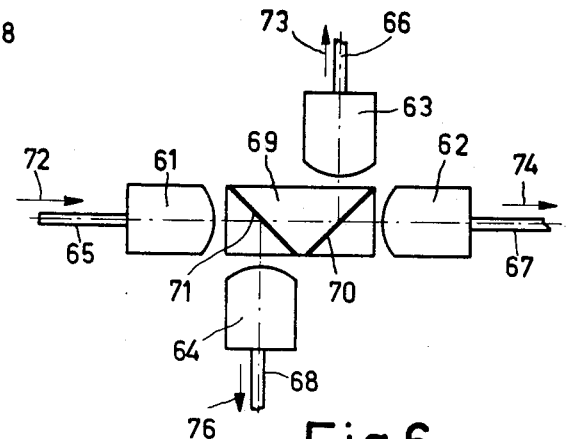
FIG. 6 is a sectional view in accordance with the plane of symmetry of a second embodiment of said device for coupling a plurality of optical paths.

FIG. 6 shows another variant. The separator element is a prism 69 with separating faces 70 and 71. A part of the flux from 65 is transferred to the fibers 66 and 68 after reflection at the faces 71 and 70 respectively via the lenses 63 and 64 which are substantially identical to the lens 61, or it is transferred to the fiber 67 via the lens 62. The arrows 72, 73, 74 and 76 indicate the direction of propagation of the light.

Such a device also enables the throughput volume of a plurality of fibers of the same diameter as the fiber at the transmission end to be saturated, of course with a luminance which is smaller than that of the light in the fiber at the transmission end, but without the necessity of sacrificing a substantial portion of the flux, which would be the case if these three fibers were united to one bundle because the packing coefficient of said bundle is necessarily smaller than 1.

Figure 7:
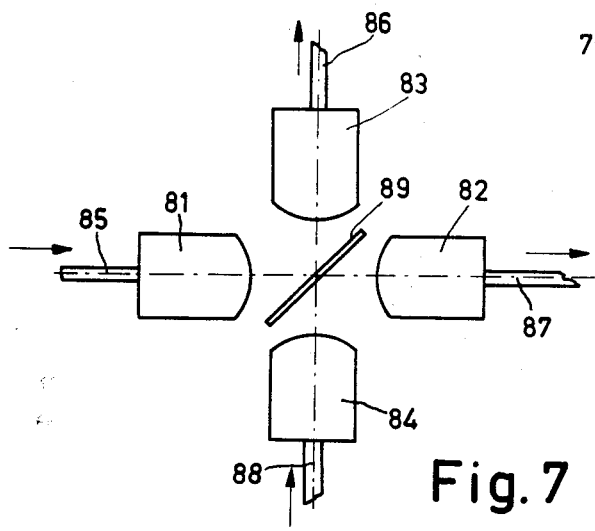
FIG. 7 is a sectional view in accordance with the plane of symmetry of a third embodiment of said device for coupling a plurality of optical paths.

Such configurations also enable mixing devices to be formed, as is shown in FIG. 7. In this Figure two devices of the type of FIG. 4 are arranged in such a way that their axes are disposed in substantially the same plane and are perpendicular to each other.

A separator plate 89, which is inclined relative to said axes, transmits and reflects the light containing the information from the fibers 85 and 88 and thus mixes these two sets of information, which are available again at the fibers 86 and 87.

In another variant the light in the fiber 85 conveys information in two different wavelength ranges. The plate 82 is a dichroic layer which separates the two ranges. One of them returns to the fiber 86 by reflection, while the other returns to the fiber 87 by transmission.

What is claimed is:

1. An optical device for coupling a source of radiation energy to an optical fiber, comprising in the direction of propagation of light, a first thick plano-convex lens, a thick second plano-convex lens, said two lenses having their convex sides facing and substantially in contact with each other and their axes coinciding with that of a fiber at the fiber input, a source of light energy disposed substantially perpendicular to the lens axis in the immediate vicinity of the center of the plane surface of the first lens and the input end-face of the fiber in the immediate vicinity of the center of the plane surface of said second lens, the radii of curvature of the dioptric faces of the two lenses, their diameters, their thicknesses and the refractive indexes of their constituent materials being such that the system formed by the two lenses optically conjugates the source to the input end-face of the fiber, the diameter of the image of the source being substantially equal to the diameter of the fiber, the image aperture angle being at least equal to half the acceptance angle of the fiber, and the ratio of the radii of the convex dioptric surfaces being such that the spherical aberration is minimal for the selected magnification and the refractive indexes of the materials of the lenses.

2. A device as claimed in claim 1, wherein the two lenses consist of materials having the same refractive index.

3. A device as claimed in claim 1, wherein the lenses consist of materials having different refractive indexes.

4. A device as claimed in claim 2, wherein:
the diameter of the source is smaller than the diameter of the optical fiber;
the convex faces of the two lenses are substantially in contact with each other;
the ratio of the thickness of the second lens to that of the first lens is greater by an amount of the order of 25% than the ratio of the respective fiber diameters to that of the source;
the radius of curvature of the first lens is smaller than that of the second lens.

5. A device as claimed in claim 4, wherein the refractive index is greater than 1.7, that the diameter of the fiber is 3 to 4 times greater than that of the source, that radius of curvature of the first lens ranges between 1.9 and 2.5 mm and that of the second lens between 3.3 and 5 mm, and the thickness of the first lens is 3 to 4 mm and that of the second lens 9 to 16 mm.

6. A device as claimed in claim 4, wherein the refractive index lies between 2.4 and 2.5, the diameter of the fiber is 3 to 6 times greater than that of the source, the radius of curvature of the first lens is between 2.5 and 3 mm and that of the second lens between 4 and 9 mm, and the thickness of the first lens is between 2.5 to 4 mm and that of the second lens from 15 to 24 mm.

7. A device as claimed in claim 2, wherein the diameter of the source equals the diameter of the fiber at the output, and the two lenses are identical.

8. A device as claimed in claim 7, wherein the lenses have a thickness of the order of 5 mm, and their radius of curvature range between 1.5 and 3 mm depending on the refractive index of the material used, said refractive index being greater than 1.45.

9. A device as claimed in claim 7 wherein the two lenses are separated by an air gap of several millimeters.

10. A device as claimed in claim 9 for coupling a plurality of optical paths, which substantially coincide in one point, wherein paths on both sides of the point comprise at least one fiber which at its end is provided with a lens, the air gap between the lenses containing means for separating the beams which transmit the light in certain paths and which reflect it in other paths, as well as means for locally detecting or injecting radiation energy.

11. A device as claimed in claim 10, wherein the separating means is a mirror which effects a spectrol selection of the light.

* * * * *

UNITED STATES PATENT OFFICE
CERTIFICATE OF CORRECTION

Patent No. 4,102,559  Dated July 25, 1978

Inventor(s) JEAN-JACQUES HUNZINGER

It is certified that error appears in the above-identified patent and that said Letters Patent are hereby corrected as shown below:

Col. 1, line 23, "which" (first occurrence) should be --with--;

Col. 5, line 66, "$1/\alpha 3$" should be --$1/\alpha^3$--;

Col. 10, line 35, "Spectrol" should be --spectral--

Signed and Sealed this

Twenty-fourth Day of April 1979

[SEAL]

Attest:

RUTH C. MASON
*Attesting Officer*

DONALD W. BANNER
*Commissioner of Patents and Trademarks*